United States Patent [19]
Varin

[11] Patent Number: 5,788,576
[45] Date of Patent: Aug. 4, 1998

[54] COUPLING PULLEY

[75] Inventor: Hervé Varin, Ballan, France

[73] Assignee: Hutchinson, Paris, France

[21] Appl. No.: 641,898

[22] Filed: May 2, 1996

[30] Foreign Application Priority Data

May 12, 1995 [FR] France .................. 95 05643

[51] Int. Cl.$^6$ .................................. F16D 3/68
[52] U.S. Cl. .................. 464/83; 464/89; 464/160
[58] Field of Search .................... 464/160, 73, 74, 464/76, 83, 89, 100

[56] References Cited

U.S. PATENT DOCUMENTS

| | | |
|---|---|---|
| 1,561,476 | 11/1925 | Masury et al. . |
| 3,620,044 | 11/1971 | Latour ................... 464/83 X |
| 4,307,584 | 12/1981 | Sandiumenge ............ 464/74 |
| 4,328,879 | 5/1982 | Tone ..................... 464/74 X |
| 4,486,183 | 12/1984 | Posiviata et al. ......... 464/74 X |
| 4,747,796 | 5/1988 | Iwai et al. .............. 464/83 X |
| 4,779,470 | 10/1988 | Morita et al. ........... 464/76 X |
| 4,795,402 | 1/1989 | Reichardt ............... 464/76 X |
| 5,377,962 | 1/1995 | Ochs et al. . |
| 5,474,499 | 12/1995 | Olson .................... 464/83 |
| 5,545,089 | 8/1996 | Kirschey et al. ......... 464/83 |

FOREIGN PATENT DOCUMENTS

| | | |
|---|---|---|
| 12669 | 6/1980 | European Pat. Off. . |
| 43687 | 1/1982 | European Pat. Off. . |
| 2090092 | 1/1972 | France . |
| 1958129 | 6/1971 | Germany ............... 464/76 |
| 4309745 | 9/1994 | Germany . |
| 2070194 | 9/1981 | United Kingdom . |

*Primary Examiner*—Eileen A. Dunn
*Attorney, Agent, or Firm*—Bell Seltzer Intellectual Property Law Group of Alston & Bird LLP

[57] ABSTRACT

A decoupling device comprising first and second coaxial elements in mutual rotary driving engagement and including resilient decoupling means enabling relative angular displacement for decoupling purposes between the first and second elements. The decoupling members comprise at least one fin carried by the first element and at least one first and one second abutment carried by the second element and angularly spaced apart one from the other, and at least one first and one second resilient device interposed between the fin(s) and the first and second abutments, respectively.

12 Claims, 7 Drawing Sheets

COUPLING PULLEY

The present invention relates to a decoupling device and in particular a decoupling pulley that is intended for use on a motor vehicle, and that comprises first and second coaxial elements in mutual rotary driving engagement and including resilient decoupling means enabling relative angular motion to take place between the first and second elements for decoupling purposes.

BACKGROUND OF THE INVENTION

The Applicant has put on the market a decoupling pulley designed for use with a motor vehicle alternator in which the resilient decoupling means is constituted by a V-section rubber ring bonded both to a ring that is clamped in a rim driven by a belt and to a hub that is screwed to the shaft of the alternator. In that configuration, whenever the vehicle engine is instantaneously subject to acceleration or to deceleration, limited angular displacement in one direction or the other is possible between the rim and the hub by resilient deformation of the annular element.

A decoupling pulley of that type suffers from the drawback of the pulley-and-alternator assembly having a resonant frequency. Under the conditions normally to be found in motor vehicles, this resonant frequency lies in the range 20 Hz to 30 Hz. This resonant frequency depends, in particular, on the stiffness of the rubber used for the rubber ring and on the inertia of the alternator. To reduce this resonant frequency and move it away from the idling frequency of the engine, e.g. 25 Hz for a four cylinder engine and 35 Hz for a five cylinder engine, it is necessary to increase the outside diameter of the annular element, which also implies increasing the axial length of the decoupling pulley in order to accommodate the larger element and therefore increasing the volume occupied by the pulley, thus giving rise to considerable practical constraints.

OBJECTS AND SUMMARY OF THE INVENTION

An object of the invention is to provide a decoupling device which is intrinsically free of any harmful resonant frequency and which is also relatively easy to construct, and in particular which does not require any rubber-bonding.

In a preferred embodiment, another object of the invention is to provide a decoupling device whose characteristic can be caused to vary.

The invention thus provides a decoupling device comprising first and second coaxial elements in mutual rotary driving engagement and including resilient decoupling means enabling relative angular motion to take place between the first and second elements for decoupling purposes, in which the decoupling means include at least one extension such as a fin carried by the first element and at least one first and one second abutment carried by the second element and angularly spaced apart relative to each other, and at least one first and one second resilient device interposed between the fin(s) and the first and second abutments respectively.

In a preferred embodiment, enabling the operating characteristics of the device to be modulated, the first and second resilient devices occupy only a fraction of the angular space between the first and second abutments such that the displacement of the extension(s) takes place over a freewheel first decoupling zone and over a resilient second decoupling zone.

In particular, in a central position where the fin(s) is/are uniformly spaced apart from the first and second abutments, at an angle equal to half said angular spacing, it is advantageous for preferably-equal first and second angular sectors to subsist between the extensions, e.g. of the fins, and the first and second resilient devices, respectively.

The first element may be a hub and the second element may be a rim outside the hub, or vice versa the second element may be a hub and the first element may be a rim outside the hub.

The hub may have means enabling a shaft driven by the hub to be screwed thereto. The rim may have a cylindrical periphery having a grooved-profile suitable for receiving a belt for driving the hub. This correspond to an application as a decoupling pulley for the alternator of a motor vehicle.

The extension(s), e.g. of the fins, the abutments, and the resilient devices are advantageously all received inside the rim. The device may include a ball bearing enabling the rim to rotate relative to the hub.

In particular, a compact structure that does not increase the outside dimensions of the device may be obtained because the ball bearing plus the assembly constituted by the extension(s), e.g. the fins, the abutments, and the resilient devices are disposed longitudinally in line with one another inside the rim and around the hub.

In a variant that is more particularly suitable for pulleys of small effective diameter, the device includes a smooth bearing allowing the rim to rotate relative to the hub, and wherein the extension(s), e.g. the fins, the abutments, and the resilient devices are disposed outside the main portion of the rim.

It is advantageous for the fin(s) and the resilient devices to have complementary profiles that are respectively convex and concave.

BRIEF DESCRIPTION OF THE DRAWINGS

Other characteristics and advantages of the invention appear more clearly on reading the following description, given by way of non-limiting example and made with reference to the accompanying drawings, in which.

MORE DETAILED DESCRIPTION

The rotor of a motor vehicle alternator is a rotary mechanical part having considerable inertia. This inertia combined with a speed excitation signal from an internal combustion engine gives rise to variations in torque and thus to variations in the tension of the belt driven by the engine and in turn driving not only the alternator but also various other items (water pump, etc. . . . ).

Variations in transmission belt tension are critical when the engine excitation signal is severe and when the inertia of the alternator is great. When variations in tension are too great, there is a risk of the belt breaking, of premature wear of the bearings for the driven accessories, of noise, and/or of vibrations of the belt and the automatic belt tensioner.

To reduce such variations in tension generated by the inertia of the alternator, suggestions have been made to decouple the alternator rotor from the engine excitation signal as delivered by the belt, either by means of a decoupling pulley which may be fixed on the alternator shaft, or else by means of a decoupler pulley driven by the engine. In the description below, particular attention is given to the case of a decoupler pulley for the alternator, however it will be observed that the same technical concept can be applied to a decoupler pulley mounted on the engine shaft and which provides decoupling between the engine shaft and the belt, or to any other pulley forming a part of a belt or chain transmission system.

The purpose of a decoupling pulley is smoothing, i.e. to achieve, on the alternator rotor, an oscillating component of angular amplitude that is smaller than the amplitude of the oscillating component of the excitation delivered by the belt, thereby considerably reducing variations in the tension of the belt and in particular variations due to intrinsic irregularities in the cycle of an internal combustion engine and which give rise to cyclical variations about an operating point, regardless of whether the engine is loaded or idling. For example, an engine that is idling presents relative variation in its speed of rotation d•/• that is of the order of 20% peak to peak and it is advantageous to reduce the impact thereof on the rotor, since otherwise the belt is subjected to repeated variations in tension of large amplitude that give rise to the above-mentioned defects (wear of the belt and of the bearings, noise, and vibration).

Figure 1A:
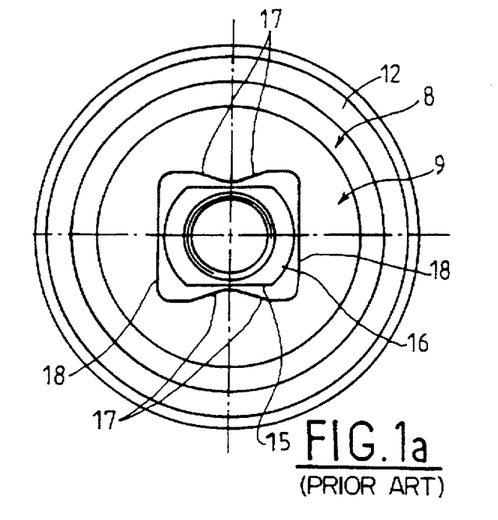
FIGS. 1a and 1b are respectively a front view and a longitudinal section view of a decoupling pulley of the prior art as mentioned above.
Figure 1B:
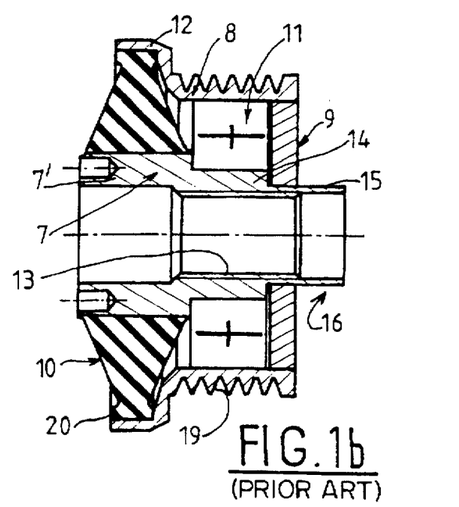

The decoupling alternator pulley already sold by the Applicant, as shown in FIGS. 1a and 1b, comprises a hub 7 which is screwed to the shaft 13 of the alternator of the vehicle fitted therewith, an outer rim 8 having stripes 19 suitable for receiving excitation motion from the belt and for transmitting it, and an end plate 9 which is tightly mounted within the rim 8. The rim 8 has a flange 12 of diameter greater than the outside diameter of the remainder of the rim and within which there is mounted as a tight fit a ring 20 whose inside face is bonded to the outer periphery of an annular element 10 of rubber of generally V-shaped section. The inside surface of the annular element 10 is bonded to the outer perimeter of one end 7' of the hub 7 whose diameter is greater than the diameter of the remainder of the hub 7, which hub also includes a cylindrical region 14 that receives a ball bearing that is a tight fit between the rim 8 and the hub 7, and that is also provided with a flat extension 16 having flats 15. The extension 16 projects through the end plate 9 via an opening 18 that is generally substantially square in shape but that is provided on two opposite faces with inwardly-directed V-shaped projections 17 which co-operate with the flats 15 to limit the magnitude of relative rotation between the rim 8 and the hub 7 in either direction by metal on metal contact between the flats 15 and the edges of the V-shaped projections 17.

As mentioned above, the device operates by twisting the resilient element 10, and it has a resonant frequency which, for common sizes of pulley and of alternator shaft, lies very close to the characteristic frequencies of an engine, such as the frequency corresponding to a four- or five-cylinder engine idling. It is this constraint that makes it necessary to provide the element 10 with a diameter greater than the nominal diameter of the rim 8 so as to lower the resonant frequency to move it out of the range of resonant frequencies that are encountered in practice.

This has several drawbacks. Firstly, it is practically essential to design a special type of pulley for each vehicle that is to be fitted therewith. This is because the resonant frequency encountered depends, amongst other things, on the inertia of the alternator. Secondly, the extra size imposed by having the extra diameter required for implementing the element 10 requires the installation of the pulley to be specially designed in each vehicle that is to be fitted therewith. The space available in the engine compartment of motor vehicles is becoming smaller and smaller, so this constraint is becoming more and more important. Finally, the trend of fitting motor vehicles with more and more electrical accessories means that the size of alternators and thus their inertia is also increasing, and this increase in inertia requires the elastomer used to be overdimensioned in order to guarantee good lifetime.

As a result, the design of decoupling pulley as described above cannot be used in all vehicles.

Another drawback of that pulley is the cost of assembling it which requires, in particular, the annular element 10 to be installed and bonded.

Another drawback of that pulley is also the noise that it is liable to generate given that under severe conditions, such as those encountered when starting, two metal elements (15, 17) come into abutment against each other.

Figure 2A:
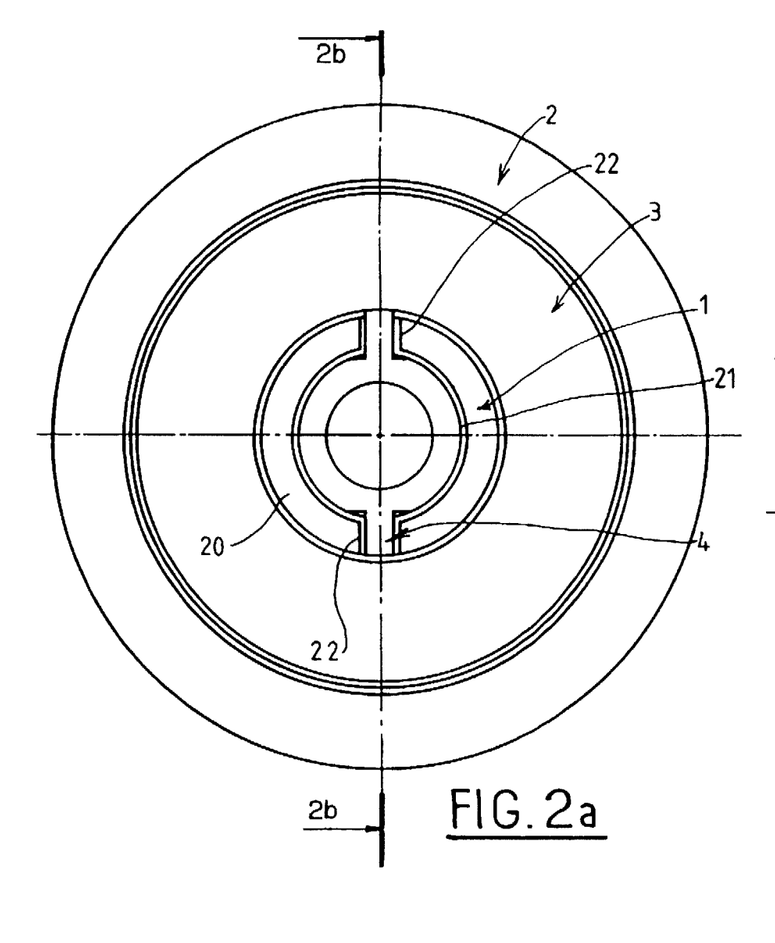
FIGS. 2a and 2b are respectively a front view and a longitudinal section view of a decoupling pulley constituting a preferred embodiment of the invention and details of which are given as follows: the hub in front view and in longitudinal section view, FIGS. 3a and 3b respectively; the rim in longitudinal section view and in lefthand view, FIGS. 4a and 4b respectively
Figure 2B:
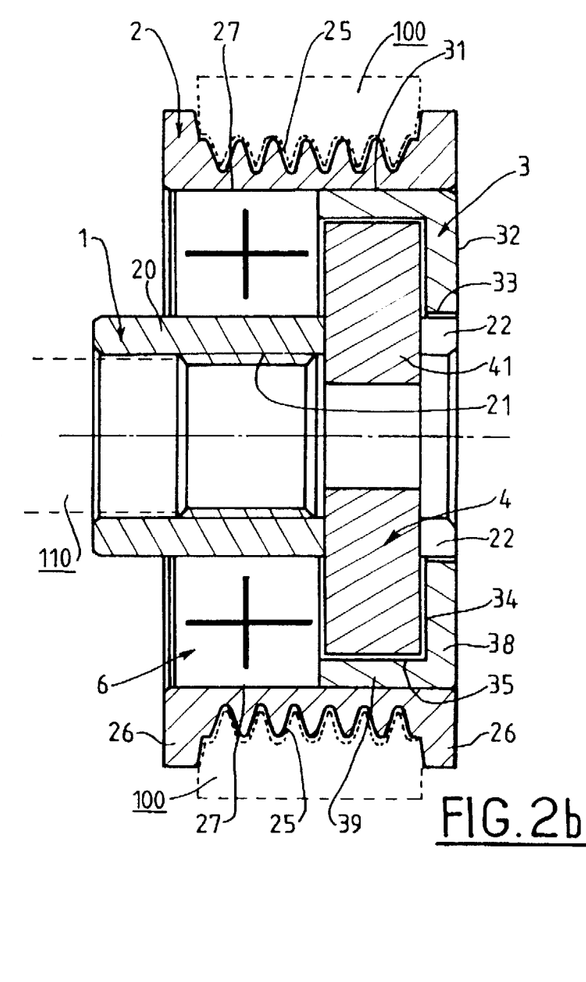

As shown in FIGS. 2a and 2b, the device of the invention comprises a hub 1 which is screwed to the shaft 110 of the alternator, a cylindrical outer rim 2 having flanges 26 and a grooved path 25 which receives drive from the belt 100 and transmits it, and an end plate 3 which is tightly mounted via its outer periphery 31 in an inner periphery 27 of the rim 2. The end plate 3 has a plane plate portion 38 whose face is level with one end of the rim 2 and which is extended around its periphery by an annular region 39 whose periphery 31 is a force-fit in the inside periphery 27 of the rim 2, as mentioned above, and whose inside periphery 35 cooperates with the face 34 of the plate portion 38 to define a housing for the resilient decoupling device described below. A ball bearing 6 is a tight fit in the rim 2 and on the hub 1, enabling them to rotate one relative to the other while transmitting interfering axial forces.

Figure 3A:
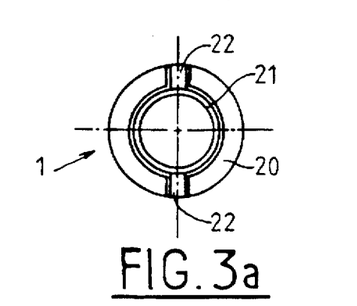
Figure 3B:
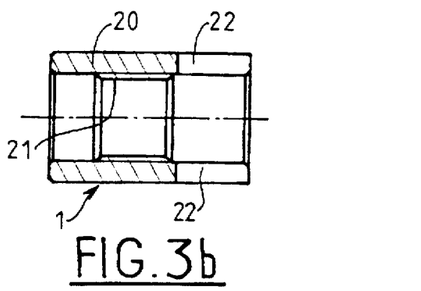
Figure 4A:
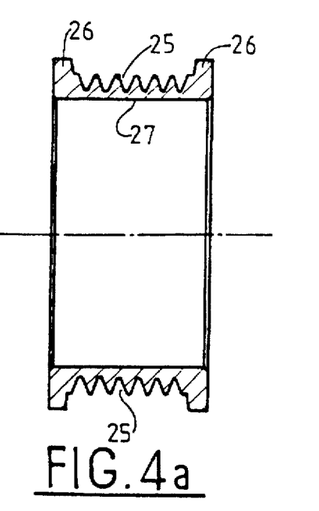
FIG. 4a is taken along line 4a—4a of FIG. 4b; the end plate in front view and in longitudinal section view, FIGS. 5a and 5b respectively; and the blade-member in side view and in lefthand view FIGS. 6a and 6b respectively.
Figure 4B:
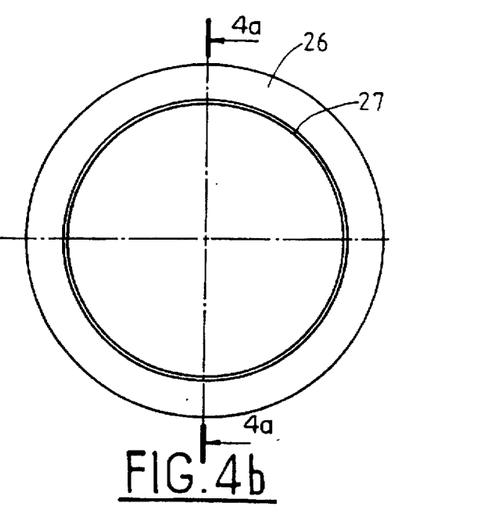

The hub 1 (see FIGS. 3a and 3b) is a cylindrical part 20 split by two diametrically opposite slots 22 extending from the end of the hub that is received in the opening 33 (FIG. 2b) of the plane region 38 of the end plate 3, which slots 22 serve to receive the fins 41 of a blade-member 4 as force-fits (see FIG. 2b).

Figure 5A:
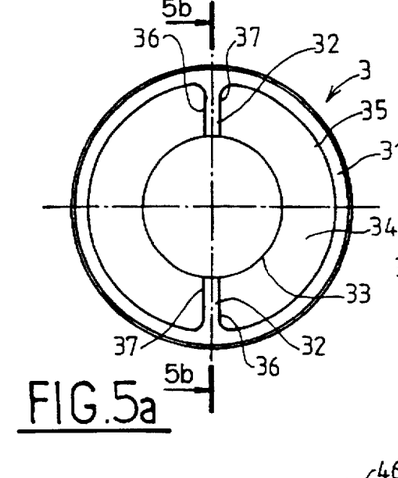
Figure 5B:
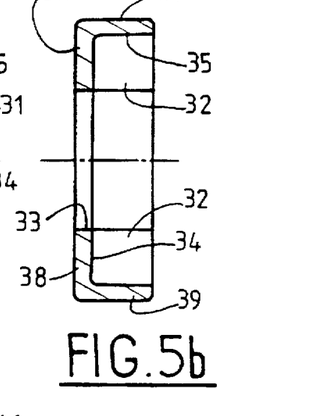
Figure 6A:
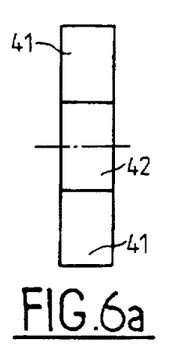
Figure 6B:
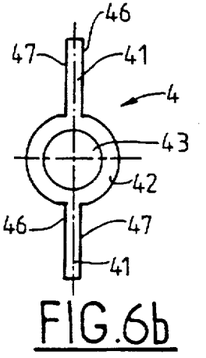

The end plate 3 has two ribs 32 defining a total of four abutments 36, 37 (see FIG. 5).

Figure 9A:
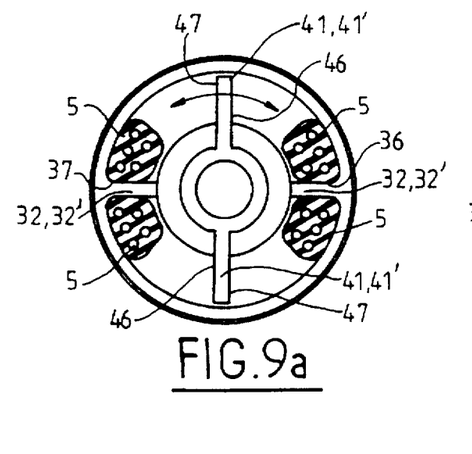
FIGS. 9a and 9b show respectively a middle position and an abutment position for rotation of the hub relative to the assembly comprising the rim and the end plate for a version that has two blades and two abutments.
Figure 9B:
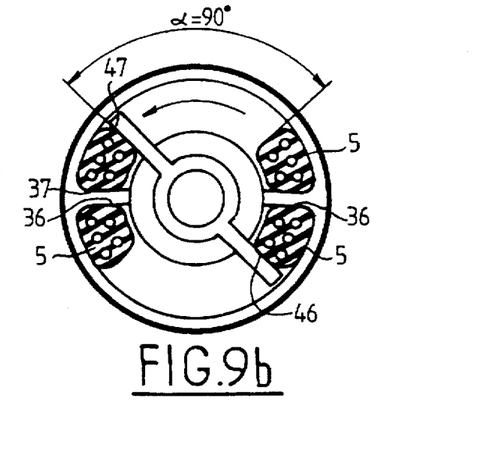

As shown in FIGS. 9a and 9b, resilient elements 5, e.g. made of rubber or more particularly of cellular rubber are interposed between the fins 41 and the abutments 32, giving four rubber elements 5. It can thus be seen that displacement of the fins 41 relative to the abutments 32 takes place in two operating zones, a first operating zone in which, for some displacement angle α shown here as being equal to 90°, relative displacement takes place freely. In this zone, total decoupling is obtained between the hub and the rim, and thus between the belt 100 and the shaft 110 of the alternator. Beyond this annular stroke, decoupling takes place resiliently by compression or expansion of the elements 5 between the fins 41 and the abutments 32. This action is symmetrical and therefore operates in both directions, i.e. both in acceleration and in deceleration.

The value of the angle α can be adjusted at will as a function of the desired results, but it should be observed that it is also possible to make do without any first zone being present so as to rely entirely on resilient operation throughout the space between the fins 41 and the abutments 32 as provided by the resilient elements 5 (α is 0).

In practice, insofar as a freewheel first zone is used, a displacement angle a will be selected to lie in the range 30° to 90°. It may be observed that the existence of this freewheel displacement angle, in addition to providing an improved decoupling effect, also has the advantage of ensuring a relatively large amount of rotation between the rim 2 and the hub 1, thereby causing the bearing 6 to operate which allows the rim to rotate relative to the hub and which withstands interfering coaxial effects, and in particular which makes it possible to lubricate the bearing effectively.

Figure 10A:
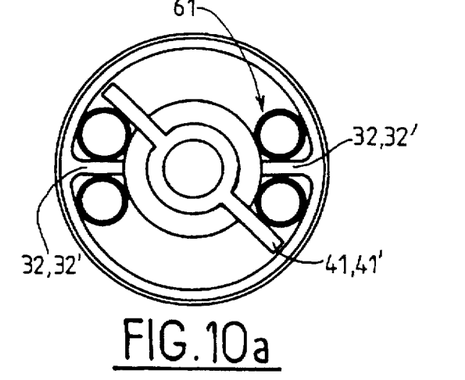
FIGS. 10a and 10b show two variants of FIG. 9b, respectively using circular metal springs and using metal or composite spring blades.
Figure 10B:
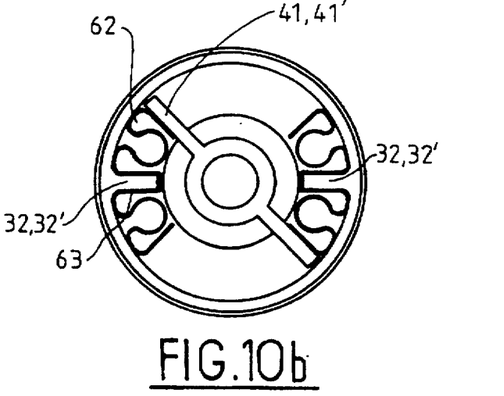

FIGS. 10a and 10b show a variant of the device shown in the FIG. 9b position, and in which the resilient elements are circular metal springs 61 (FIG. 10a), or resilient metal blades, or composite metal blades 62, or any other type of spring (see FIG. 10b). In particular, the blades 62 may include a U-shaped region 63 that is fixed on the abutments 32.

Figure 7A:
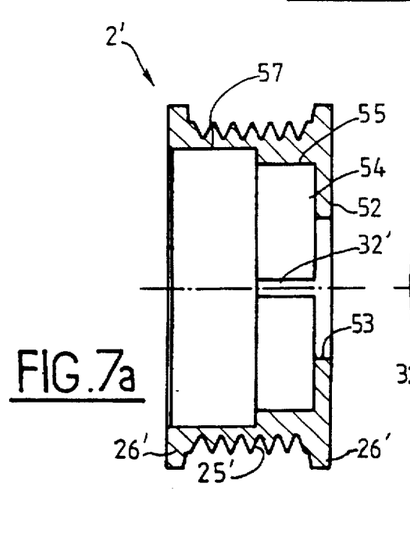
FIGS. 7a and 7b show a variant in which the hub and the end plate are integral, corresponding to a two-blade hub.
Figure 7B:
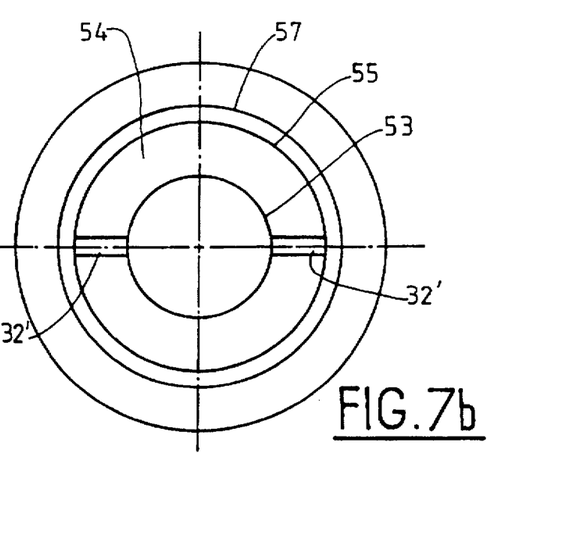

FIGS. 7a and 7b show a variant of the invention in which the assembly constituted by the rim 2 and the end plate 3 (FIG. 2b) is replaced by an integral part 2' whose outer periphery includes a path 25' designed to receive a belt and having flanges 26' projecting therefrom, a first cylindrical internal outline 57 being designed to receive the ball bearing 6 as an external force-fit, a second cylindrical internal outline 55 which extends the outline 57 and which is designed to receive the blade-member 4, and an opening 53 through which the end of the hub 1 passes.

Figure 8A:
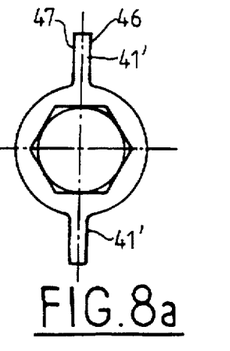
FIGS. 8a and 8b are a front view and a longitudinal section view of an integral hub and blade-member corresponding to a two-blade blade-member.
Figure 8B:
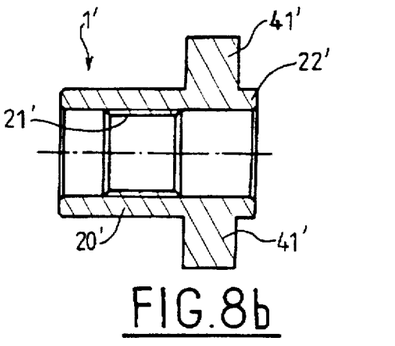

In FIGS. 8a and 8b, the hub 1 and the blade-member 4 (FIG. 2b) are replaced by an integral part 1' having a cylindrical body 20' and fins 41'. The end 22' of the cylindrical body 20' is designed to be disposed in the opening 33 or 53 of the end plate 3 or of the rim 2'.

Figure 11A:
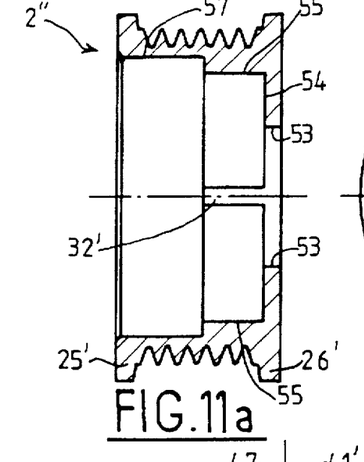
FIGS. 11a and 11b are respectively a longitudinal section and a lefthand view of an assembly comprising an integral rim and end plate unit corresponding to a four-blade hub.
Figure 11B:
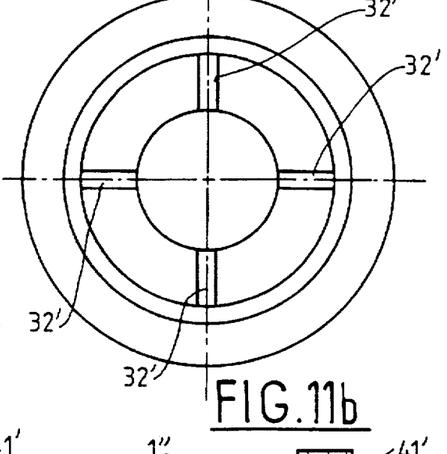

FIGS. 11a and 11b show a variant of FIGS. 7a and 7b. They differ in that there are four ribs 32', thus corresponding to eight abutments.

Figures 12A, 12B:
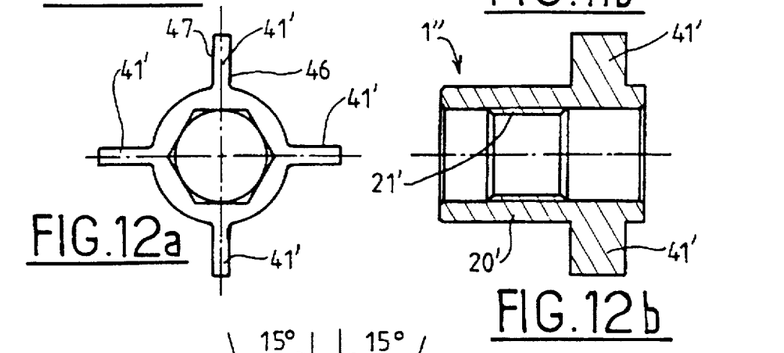
FIGS. 12a and 12b are respectively a front view and a longitudinal section view of an assembly comprising an integral hub and blade member unit corresponding to a four-blade hub.

FIGS. 12a and 12b are variants of FIGS. 8a and 8b. They differ by the fact that there are four fins 41', thus corresponding to eight abutments.

Figure 13:
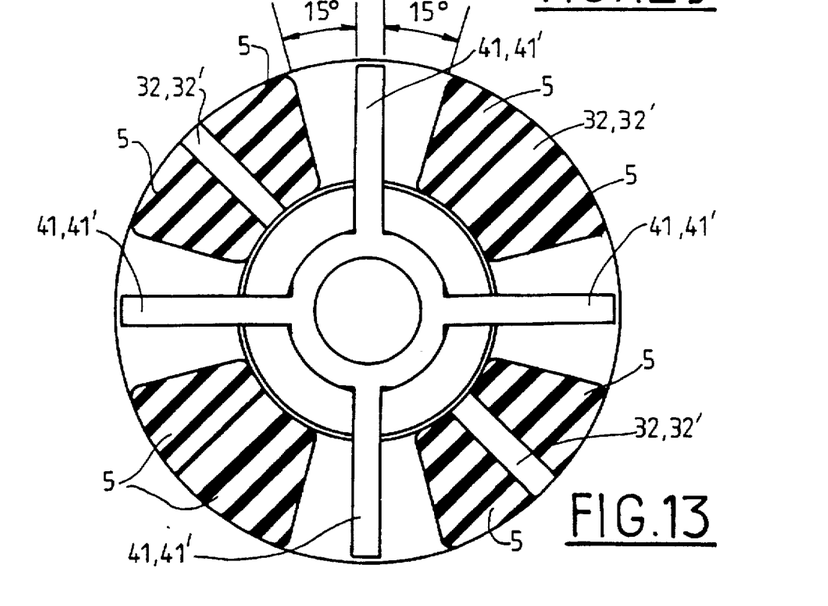
FIG. 13 shows a preferred variant of the invention provided with eight end-of-stroke abutments.

FIG. 13 shows a preferred embodiment of the invention in which there are four fins 41 or 41' and also four ribs 32 or 32', thus corresponding to eight abutments. There are eight resilient elements 5, and in the example shown the angle α is equal to 30°, i.e. twice 15° on either side of the central position as shown in FIG. 13.

Figure 15A:
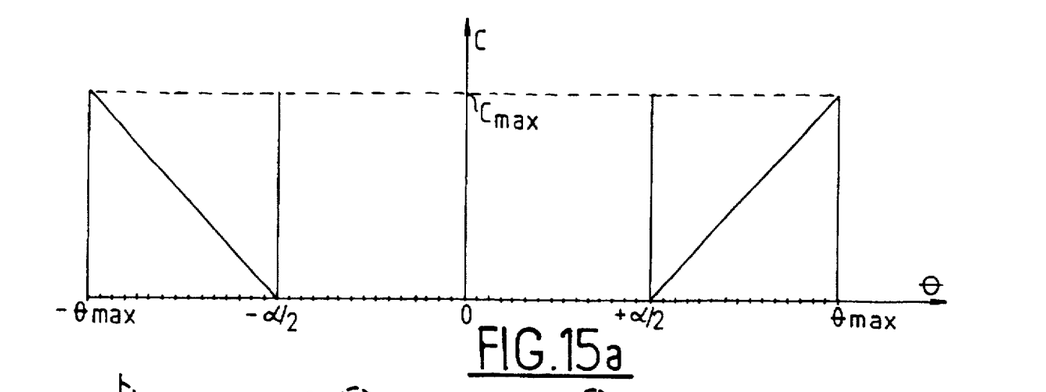
FIGS. 15a and 15b show respectively the characteristic of torque as a function of angle for a device of the invention and the result obtained with respect to decoupling the excitation signal.

FIG. 15a shows the torque characteristic of the pulley of the invention as a function of the angle Θ of relative rotation between the hub and the rim. So long as the absolute value of Θ lies in the range 0 to α/2, the torque remains equal to 0, corresponding to the first freewheel zone. When the absolute value of the angle Θ lies in the range α/2 to $\Theta_{MAX}$, the value $\Theta_{MAX}$ corresponding to the maximum torque $C_{MAX}$ encountered in the intended application, the torque C varies linearly or in application of some law that provides better decoupling, thereby providing decoupling that varies over the second zone, i.e. over the zone of resilient decoupling.

Figure 15B:
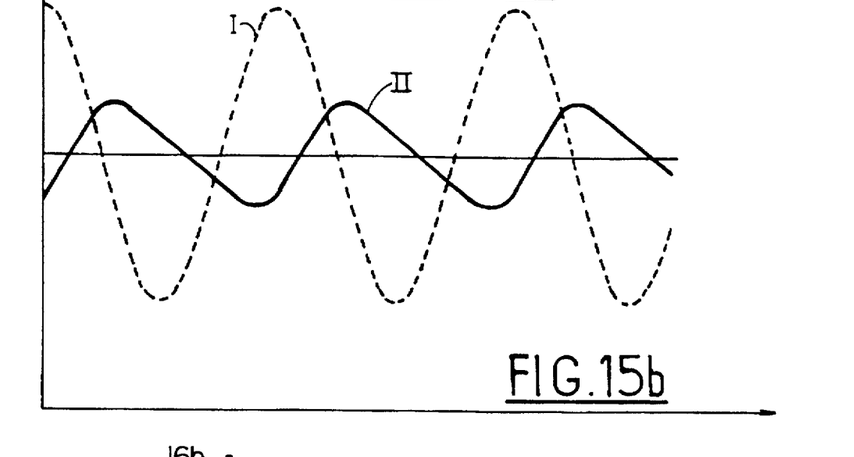

In FIG. 15b, curve I shows the speed of the drive delivered by the belt when the motor is idling, whereas curve II shows the speed of the alternator rotor. It can be seen that oscillations in alternator speed are of an amplitude that is considerably smaller than the amplitude of oscillations in curve I. An appropriate selection of the angle α serves to match the duty ratio between the two portions of the curve and under real conditions to adjust the value of the maximum amplitude of oscillation imparted to the rotor of the alternator. In particular, when α=0, i.e. when the first or freewheel zone is omitted, curve II becomes a sinewave, that is in phase opposition with curve I and of smaller amplitude than curve I, but still in the same ratio relative thereto as in the case when the freewheel, first zone is present.

Figure 14A:
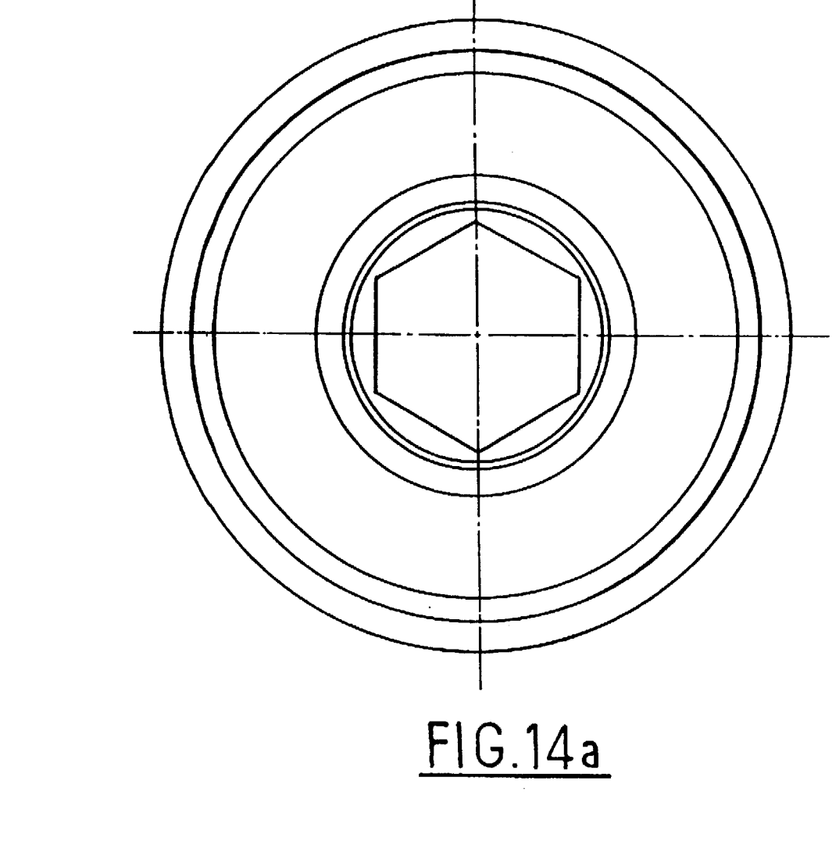
FIGS. 14a and 14b are respectively a front view and a longitudinal section view showing a variant of the invention having a smooth bearing and more particularly suitable for use with pulleys of small dimensions.
Figure 14B:
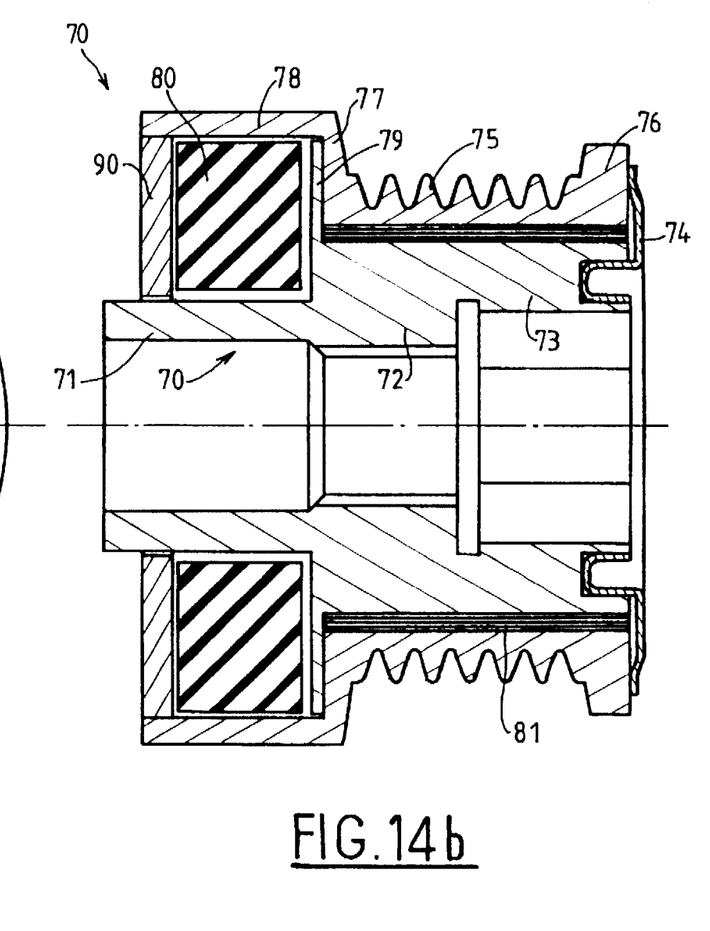

FIGS. 14a and 14b show a variant of the invention that is more particularly suitable for use with pulleys of small effective diameter, e.g. lying in the range 48 mm to 55 mm. In this case, the ball bearing 6 is replaced by a smooth bearing 81 and the outer rim is provided with a flange 76 made in conventional manner and a flange 78 of greater diameter than the outer periphery 75 of the grooved rim, so as to receive the damping assembly including the pads 80. This geometrical configuration comes to close to that used in the above-specified prior art device, but for different reasons. More particularly, the reason for offsetting the mechanical assembly for damping and decoupling beyond the end of the hub is firstly because of the small dimensions concerned, the smooth bearing 81 takes up all of the available length inside the hub, and secondly because the efficiency of the decoupling and the small amount of space available lead necessarily to placing the decoupling device on a diameter that is significantly greater than the diameter of the hub. However, in this application, the size problems that would obtain if the pulleys were of large dimensions are no longer encountered since the additional length occupied is little more than 2 cm to 3 cm, which is taken up between the belt and the case of the alternator, and, naturally, there is not any problem of resonant frequency.

Figure 16A:
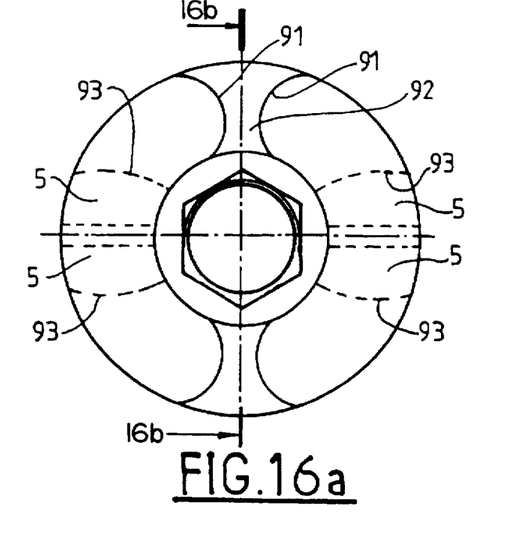
FIGS. 16a and 16b are respectively a front view and a side view of a variant of the invention having profiled fins.
Figure 16B:
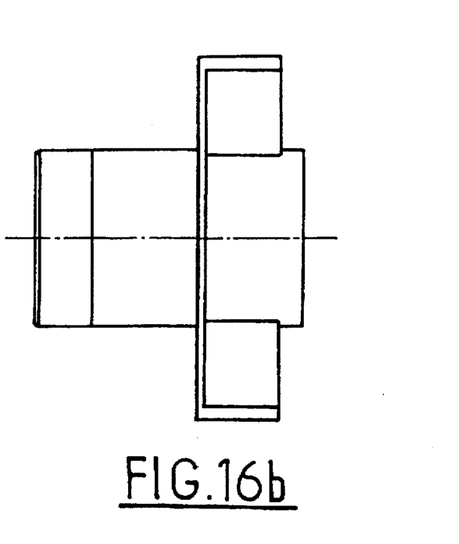

FIGS. 16a and 16b show a variant of the invention in which the fins 92 of the blade-member are concave in profile, 91, flaring slightly towards the outside, it being understood that the resilient pads 5 are of complementary convex profile 93 shown in dashed lines in FIG. 16a. This provides better docking between the fins 92 and the pads 5. In a variant, the fins 92 may be convex in profile, in which case the pads 5 are of complementary concave profile.

I claim:

1. A decoupling device comprising first and second coaxial elements in mutual rotary driving engagement and including resilient decoupling means enabling relative angular motion to take place between the first and second elements, wherein the decoupling means includes at least one fin carried by the first element and at least one first and one second abutment carried by the second element wherein said first and second abutments are angularly spaced apart relative to each other so as to define an angular space, and at least one first and one second resilient device interposed on opposing sides of the at least one fin between said at least one fin and the first and second abutment, respectively, and wherein the at least one first and the at least one second resilient devices extend an angular distance less than said the angular space defined between the first and second abutments such that the displacement of the at least one fin takes place over a freewheel first operating zone wherein said at least one fin rotates between said first and second resilient devices and does not substantially engage said first and second resilient devices and said resilient devices are substantially not deformed and over a resilient second operating zone in which said at least one fin engages said at least one first or one second resilient device to produce a resilient operating.

2. A device according to claim 1, wherein, in a central position where the at least one fin is equally spaced from the first and second abutments, at an angle substantially equal to half said angular spacing, there remain first and second angular sectors of equal size between the extension(s) and the first and second resilient devices respectively.

3. A device according to claim 1, wherein the first element is a hub and wherein the second element is a rim outside the hub.

4. A device according to claim 3, including a smooth bearing enabling relative rotation between the rim and the hub and wherein the at least one fin, the abutments, and the resilient devices are disposed outside a main portion of the rim.

5. A device according to claim 3, wherein the hub includes means enabling the hub to be secured to a shaft driven by the hub.

6. A device according to claim 3, wherein the rim has a cylindrical external periphery having a grooved profile suitable for receiving a belt driving the hub.

7. A device according to claim 3, wherein the at least one fin, the abutments, and the resilient devices are housed inside the rim.

8. A device according to claim 7, including a ball bearing enabling relative rotation between the rim and the hub, and taking up interfering axial forces.

9. A device according to claim 8, wherein both the ball bearing and the assembly constituted by the at least one fin, the abutments, and the resilient devices are disposed longitudinally in line one with the other inside the rim and around the hub.

10. A device according to claim 1, wherein the second element is a hub and wherein the first element is a rim outside the hub.

11. A device according to claim 1, wherein the extension (s) and the resilient devices have complementary profiles that are respectively convex and concave.

12. A device according to claim 1 wherein, first and second abutments are angularly displaced between 30° and 90° with respect to one another.

* * * * *

UNITED STATES PATENT AND TRADEMARK OFFICE
CERTIFICATE OF CORRECTION

PATENT NO. : 5,788,576
DATED : August 4, 1998
INVENTOR(S) : Varin, et al.

It is certified that error appears in the above-identified patent and that said Letters Patent is hereby corrected as shown below:

On the title page, item [56],

In the References Cited, U.S. PATENT DOCUMENTS, "Kirschey et al." should be --Kirschey--.

In the Abstract, line 5, "members" should be --member--;

Column 7, line 31, "operating" should be --coupling--.

Column 8, line 29, "extension" should be --at least one fin--.

Signed and Sealed this

Sixteenth Day of February, 1999

Attest:

Attesting Officer

Acting Commissioner of Patents and Trademarks